(12) United States Patent
Jain et al.

(10) Patent No.: US 10,783,103 B1
(45) Date of Patent: Sep. 22, 2020

(54) SPLIT CONTROL FOR DIRECT MEMORY ACCESS TRANSFERS

(71) Applicant: Xilinx, Inc., San Jose, CA (US)

(72) Inventors: Sunita Jain, Bangalore (IN); Bharat Kumar Gogada, Hyderabad (IN); Ravikiran Gummaluri, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 182 days.

(21) Appl. No.: 15/442,528

(22) Filed: Feb. 24, 2017

(51) Int. Cl.
| | |
|---|---|
| *G06F 13/28* | (2006.01) |
| *G06F 13/16* | (2006.01) |
| *G06F 13/42* | (2006.01) |
| *G06F 13/38* | (2006.01) |

(52) U.S. Cl.
CPC .......... *G06F 13/28* (2013.01); *G06F 13/1673* (2013.01); *G06F 13/385* (2013.01); *G06F 13/4282* (2013.01); *G06F 2213/0026* (2013.01)

(58) Field of Classification Search
CPC .... G06F 13/28; G06F 13/1673; G06F 13/385; G06F 13/4282; G06F 2213/0026
See application file for complete search history.

(56) References Cited

U.S. PATENT DOCUMENTS

| | | |
|---|---|---|
| 6,202,106 B1 | 3/2001 | Baxter |
| 6,370,601 B1 | 4/2002 | Baxter |
| 6,807,587 B1 | 10/2004 | Murray et al. |
| 7,139,848 B1 | 11/2006 | Murray et al. |
| 7,225,278 B1 | 5/2007 | Baxter et al. |
| 7,536,669 B1 | 5/2009 | Anderson |
| 7,613,902 B1 | 11/2009 | Martin et al. |
| 7,664,909 B2 | 2/2010 | Pettey |
| 7,831,801 B1 | 11/2010 | Anderson |
| 7,912,997 B1 | 3/2011 | Murray |
| 7,965,308 B2 | 6/2011 | Jauert et al. |
| 8,103,803 B2 | 1/2012 | Reddy et al. |
| 8,346,884 B2 | 1/2013 | Pettey |
| 8,913,615 B2 | 12/2014 | Pettey |
| 8,943,240 B1 | 1/2015 | Subramanian |
| 8,943,790 B2 | 2/2015 | Royer et al. |
| 9,015,350 B2 | 4/2015 | Pettey |
| 9,086,438 B2 | 7/2015 | Crooks |
| 9,106,487 B2 | 8/2015 | Pettey |
| 2003/0233497 A1* | 12/2003 | Shih .......... G06F 13/28 710/22 |
| 2005/0021884 A1* | 1/2005 | Jeddeloh ........ G06F 13/28 710/22 |
| 2005/0188129 A1* | 8/2005 | Abdelilah ........ G06F 13/28 710/52 |
| 2008/0273534 A1* | 11/2008 | Blocksome ........ G06F 13/28 370/392 |

(Continued)

*Primary Examiner* — Tim T Vo
*Assistant Examiner* — Herve Iradukunda
(74) *Attorney, Agent, or Firm* — Crawford Maunu PLLC

(57) ABSTRACT

A signature is generated to indicate a direct memory access (DMA) operation involving a transfer, by a DMA engine, of data between a host memory circuit and an endpoint memory circuit of an endpoint processor circuit. First descriptors of the DMA engine are defined relative to the endpoint memory circuit or host memory circuit. A signature is received that indicates that second descriptors have been configured by the endpoint processor circuit. In response to receiving the endpoint signature, the DMA engine is enabled to begin the DMA operation.

11 Claims, 5 Drawing Sheets

(56) References Cited

U.S. PATENT DOCUMENTS

| | | | | |
|---|---|---|---|---|
| 2008/0301704 | A1* | 12/2008 | Archer | G06F 13/387 719/313 |
| 2011/0125936 | A1* | 5/2011 | Malleth | G06F 13/128 710/26 |
| 2012/0166699 | A1* | 6/2012 | Kumar | G06F 13/385 710/306 |
| 2013/0061032 | A1* | 3/2013 | Suginaka | G06F 9/4401 713/2 |
| 2017/0185804 | A1* | 6/2017 | Elbaz | G06F 13/287 |

* cited by examiner

SPLIT CONTROL FOR DIRECT MEMORY ACCESS TRANSFERS

TECHNICAL FIELD

The disclosure generally relates to circuits and devices providing direct memory access (DMA) operations, and more particularly to splitting of control over DMA transfers between a source device and a destination device.

BACKGROUND

There are a variety of different circuits that can use DMA transfers including, but not limited to, digital signal processors (DSPs), general purpose computer processors, programmable integrated circuits, programmable logic devices (PLDs), and System on Chip (SoC) devices. PLDs are a type of programmable integrated circuit (IC) that can be programmed to perform specified logic functions. One type of PLD, the field programmable gate array (FPGA), can include an array of programmable tiles. These programmable tiles comprise various types of logic blocks, which can include, for example, input/output blocks (IOBs), configurable logic blocks (CLBs), dedicated block random access memory (BRAM), multipliers, digital signal processing blocks (DSPs), processors, clock managers, delay locked loops (DLLs), bus or network interfaces such as Peripheral Component Interconnect (PCI), PCI Express (PCIe),Ethernet, and so forth. Some devices include enough components and functionality to effectively serve as an entire computer system on a single integrated circuit (IC) chip. Devices with such functionality are sometimes referred to as SoCs. Some SoC devices can include programmable logic that is similar to programmable logic provided by various PLDs.

There are a number of complexities with successfully and efficiently implementing DMA transfer operations. Some of the complexities, such as security concerns, relate to the DMA software drivers requiring knowledge of the memory spaces of the devices involved in the DMA transfer operations. This and other problems can be problematic for devices that carry out DMA transfer operations.

SUMMARY

A number of implementations are directed toward a method carried out at a host processor circuit having a host memory space. The host processor generates a host signature indicating a direct memory access (DMA) operation involving a transfer, by a DMA engine, of data between the host memory space and an endpoint memory space of an endpoint processor circuit. The host processor configures first descriptors of the DMA engine, the first descriptors defined relative to the host memory space. The host processor receives an endpoint signature indicating that second descriptors, of the DMA engine and defined relative to the endpoint memory space, have been configured by the endpoint processor circuit. The host processor enables, in response to receiving the endpoint signature, the DMA engine to begin the DMA operation.

Some implementations are directed toward a method carried out at an endpoint processor circuit having an endpoint memory space. The endpoint processor circuit verifies a host signature that indicates a direct memory access (DMA) operation involving a transfer, by a DMA engine, of data between the endpoint memory space and a host memory space of a host processor circuit. The endpoint processor circuit configures, in response to successfully verifying the host signature, first descriptors of the DMA engine, the first descriptors defined relative to the endpoint memory space. The endpoint processor circuit generates, in response to successfully verifying the host signature, an endpoint signature for the DMA operation. The endpoint processor circuit manages, in response to the DMA engine implementing the DMA operation, endpoint DMA engine.

Various implementations are directed toward a system that includes a host processor circuit and a host memory circuit coupled to the host processor circuit and providing a host memory space. The host memory circuit stores host instructions that when executed by the host processor circuit: generate a host signature indicating a direct memory access (DMA) operation involving a transfer, by a DMA engine, of data between the host memory space and an endpoint memory space of an endpoint processor circuit; configure first descriptors of the DMA engine, the first descriptors defined relative to the host memory space; receive an endpoint signature indicating second descriptors, of the DMA engine and defined relative to the endpoint memory space, have been configured by the endpoint processor circuit; and enable, in response to receiving the endpoint signature, the DMA engine to begin the DMA operation.

Other features will be recognized from consideration of the Detailed Description and Claims, which follow.

BRIEF DESCRIPTION OF THE DRAWINGS

Various aspects and features of the method, device, and system will become apparent upon review of the following detailed description and upon reference to the drawings in which.

DETAILED DESCRIPTION

Figure 1:
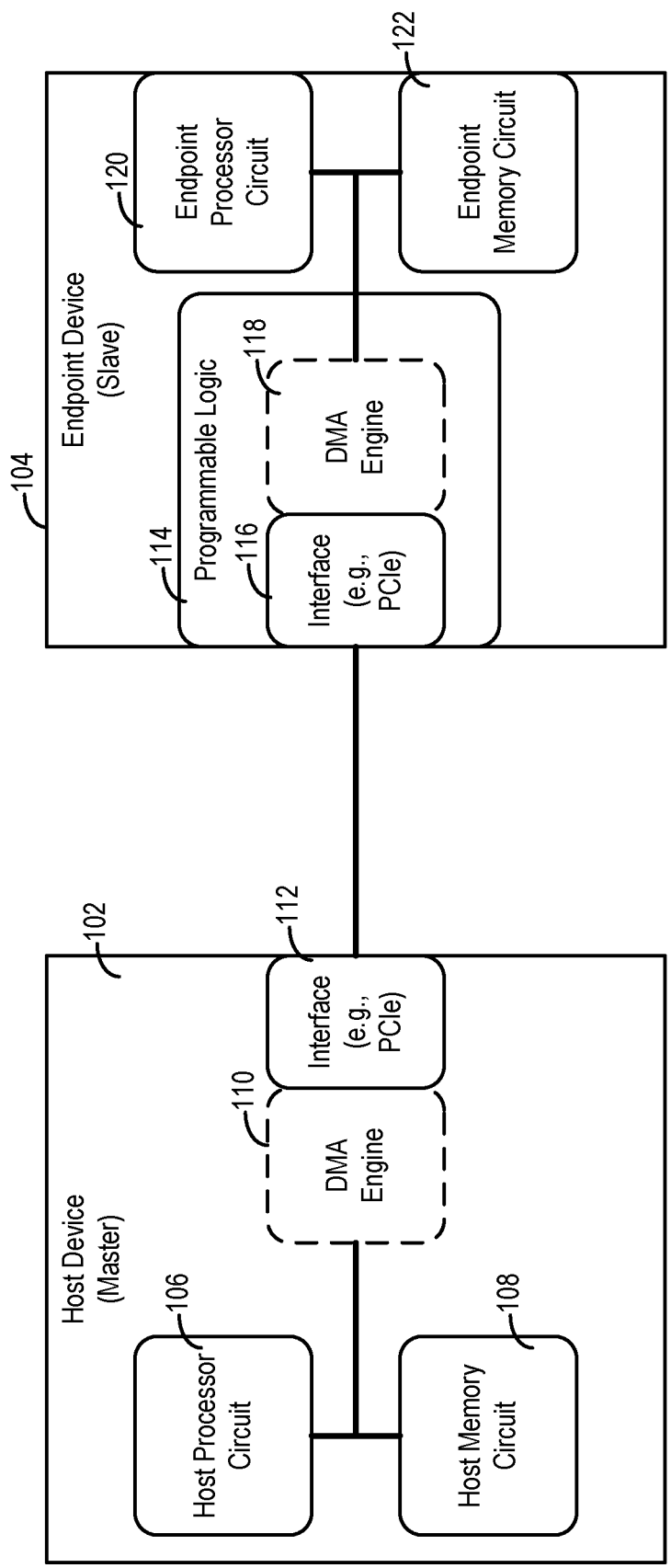
FIG. 1 depicts a block diagram of a system that implements DMA transfers between a host device and an endpoint device, consistent with implementations of the present disclosure.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Various implementations are directed toward a method for implementing DMA transfer operations between a host device and endpoint device. The method separates configuration and support of the DMA engine between multiple software drivers, one for each of the host device and endpoint device. Processors on each device configure and maintain respective portions of DMA channel(s) used by the DMA engine.

In particular implementations, each software driver can be configured to handle DMA descriptors corresponding to the memory space of their respective device. Separation of descriptor control can be particularly useful for reducing security risks associated with a driver on one of the devices needing knowledge of a memory space of the other device.

In some implementations, the software drivers, stored in a local memory as (host or endpoint) instructions on each device, coordinate control over the DMA operations by sharing status indicators. The status indicators can let the other driver know when to proceed with the next portion of the DMA configuration as well as when to enable or disable the DMA engine or particular DMA channels. Status indicators can also be used to monitor the health of the other device. Consistent with particular implementations, a shared memory space can be used to pass the status indicators (or other information) between the drivers.

The "split-Q" mode enables DMA operation by drivers at both source and destination processors and management of a single DMA channel by processors at both the source and destination devices. The split-Q mode keeps each of the source and destination devices unaware of addressing at the other device and provides security. Providing independent coalesce count controls at either device allows the post-processing of descriptors to be performed at the speed the corresponding processor operates at. For example, if an endpoint is an embedded SoC, the embedded SoC can set up a smaller coalesce count as compared to a host that is a high end server grade system, which can have a larger coalesce count.

Turning now to the figures, FIG. 1 depicts a block diagram of a system that implements DMA transfers between a host device and an endpoint device, consistent with implementations of the present disclosure. Host device 102 includes a host processor circuit 106 that is coupled to a host memory circuit 108. The host device 102 includes an interface 112 that allows communication with one or more remote devices, such as with endpoint device 104. A few non-limiting examples of types of interfaces include interfaces that use Peripheral Component Interconnect (PCI), PCI Express (PCIe), or Ethernet. Consistent with certain embodiments, the host device could be a desktop or laptop computer with one or more central processing units (CPUs).

Endpoint device 104 is depicted as including an endpoint processor circuit 120, which is coupled to an endpoint memory circuit 122. Interface 116 allows the endpoint device 104 to communicate with other devices, such as with host device 102. According to particular implementations, the endpoint device 104 is a programmable logic IC chip that includes programmable logic 114. The interface 116 can be part of the programmable logic 114 (e.g., implemented as an optional module that can be loaded into the programmable logic) or a dedicated interface (e.g., hardware that directly hardwired into the IC silicon). In particular implementations, the endpoint device 104 can be an SoC that includes one or more endpoint processor circuits 120 as well as various different input/output interfaces. The endpoint device 104 and host device 102 can include a number of additional elements than those expressly depicted and discussed herein.

The depicted system shows two possible locations for a DMA engine. In particular, a DMA engine 110 is shown as residing in the host device 102, and a DMA engine 118 is shown as residing in the endpoint device 104. Either (or even potentially both) configurations are possible. For the ease of discussion, various implementations are discussed relative to a DMA engine 118 residing in the endpoint device 104, with the recognition that the DMA engine 110 can often be used in a similar fashion. The DMA engine can be implemented as a hardwired logic circuit, a programmable logic circuit, or as a processor executing program instructions.

Consistent with particular implementations, the host device 102 and the endpoint device 104 are each configured with a corresponding DMA driver that can be stored in host memory circuit 108 and endpoint memory circuit 122 for execution by the respective processor circuits 106, 120. As discussed in more detail herein, the drivers can be configured to coordinate with one another in order to configure respective DMA descriptors. For example, a DMA operation might involve the transfer of data from host memory circuit 108 (the source) to endpoint memory circuit 122 (the destination). The host driver can cause the host processor circuit 106 to configure the source DMA descriptors, while the endpoint driver can cause the endpoint processor circuit 120 to configure the destination DMA descriptors. For a DMA operation that involves a transfer of data from the endpoint memory circuit 122 to the host memory circuit 108, the endpoint processor circuit 104 configures the source DMA descriptors and the host processor circuit 106 configures the destination DMA descriptors. According to particular implementations, the DMA descriptors for the endpoint and host devices can be stored in their respective memory spaces. The DMA engine can then retrieve the descriptors and store them as part of respective first-in first-out (FIFO) buffers within memory that is internal to the DMA engine. The DMA engine uses the descriptors to access respective memory spaces and thereby carry out the DMA transfers between the memory spaces.

According to various implementations, a portion of the endpoint memory circuit 122 can be used as a shared (scratchpad) by both devices for handshaking purposes and other communications between the host device 102 and the endpoint device 104. Alternatively, a portion of host memory circuit 108 can be used for the same purpose. In certain implementations, scratchpad registers within a DMA engine can be used for handshaking purposes and for other communications between the host and the endpoint. These communications can include status indicators that ensure that each driver has reached the correct state before the other driver advances (e.g., by enabling the DMA engine). The communications can also indicate potential problems with either device (e.g., using heartbeat status indicators that each device periodically refreshes and checks).

Figure 2:
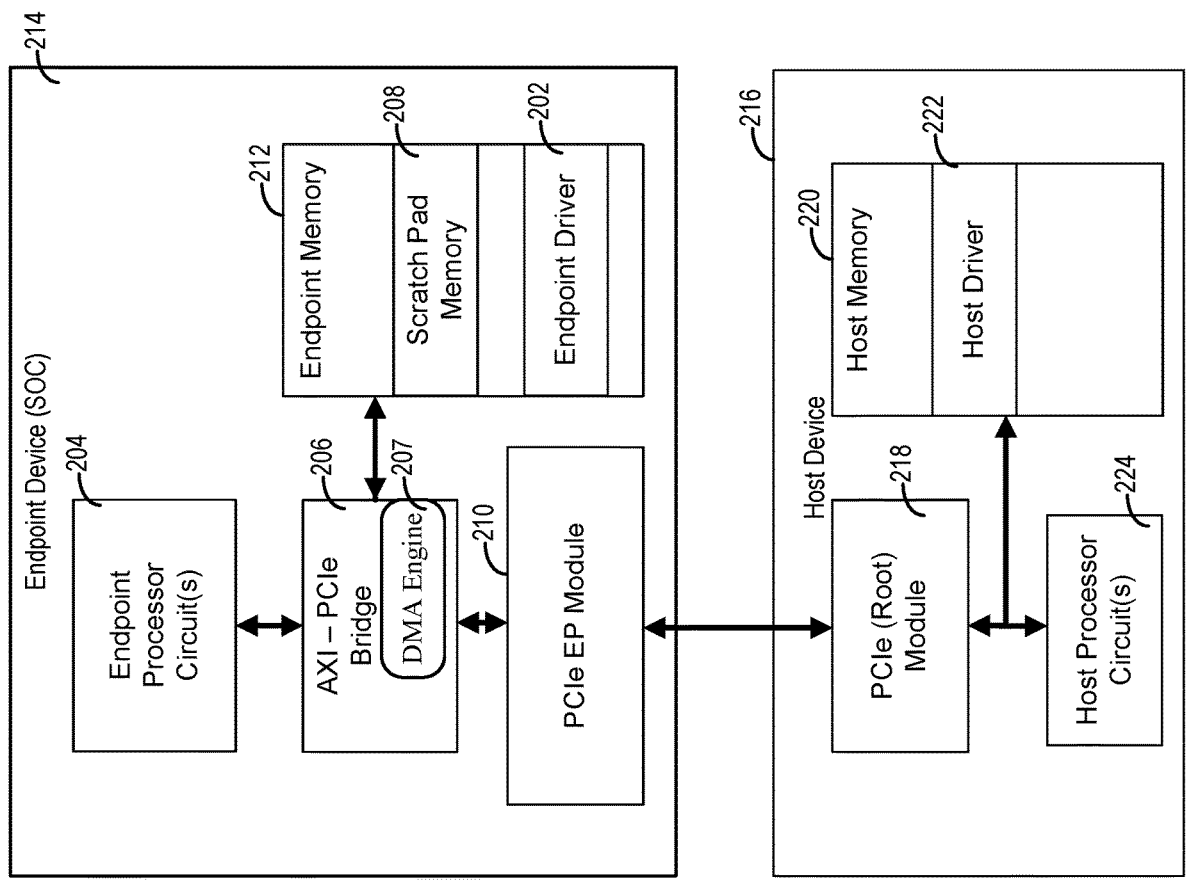
FIG. 2 depicts a block diagram of a system configured to use DMA over PCIe, consistent with implementations of the present disclosure.

FIG. 2 depicts a block diagram of a system configured to use DMA over PCIe, consistent with implementations of the present disclosure. According to certain implementations, the endpoint device (SoC) 214 and the host device 216 can be configured to use a PCIe endpoint module 210 to carry out DMA operations. SoC 214 can also include a PCIe endpoint (EP) module 210 and the Advanced eXtensible Interface (AXI)-PCIe Bridge 206, which also includes the DMA engine 207. As discussed herein, a DMA engine 207 can include a set of registers or queues that can be written to in order to setup and control DMA transfers. These registers can include descriptors that define source addresses, destination addresses, and status queues.

In some implementations, host device 216 can be configured to function as a PCIe root module/complex 218 of the system. PCIe root module 218 can be configured to allow host processor 224 to control access to host (local/main) memory 220 during normal operation.

According to certain implementations, the endpoint device 214 can be configured to also set aside a portion of endpoint (on-chip) memory 212 for use as scratch pad memory region 208. The scratch pad memory region 208 can be used by both the SoC 214 and the host device 216. For instance, after host driver 222 has been inserted by the host processor 224, the host driver 222 can write a host signature to the scratch pad memory area 208. The endpoint driver 202 can access the scratch pad memory area to detect and confirm the host signature. The endpoint driver can then write an endpoint signature to indicate that the endpoint driver is ready to proceed (e.g., after the endpoint-specific DMA descriptors have been configured). Additional information can also be transferred in this manner, including but not limited to, the configuration for DMA source and destination buffers and heartbeat signatures for each of the devices.

Host device 216 can include a processor circuit 224 and host memory 220. In certain implementations, the processor circuit 224 and host memory 220 could be part of an X-86 system; however, other types of processor systems are also possible. The host device can include a PCIe root module 218 that is configured to operate as the root complex for the entire system (for the host system 216, SoC 214, and other EP devices). After startup, the PCIe root module can enumerate the PCIe endpoint devices in the system, including SoC 214. The enumeration process includes defining addressing mapping that allows the PCIe endpoint devices (including SoC 214) and PCIe root module to communicate.

Endpoint processor 204 is shown as interfacing with a bridge 206. Advanced eXtensible Interface (AXI) is an example of a local bus interface that can be used by processors; however, various implementations are not limited to the use of a specific bus interface.

According to some implementations, software drivers executing on each of the host device 216 and SoC 214 can be configured to configure respective DMA descriptors in response to signatures being detected in the scratch pad memory region 208. Alternatively, one or more registers of a DMA engine could be used for this purpose. This detection can include, for example, polling a particular location within the scratch pad memory region 208 to detect one or more signature (handshake) data values.

Figure 3:
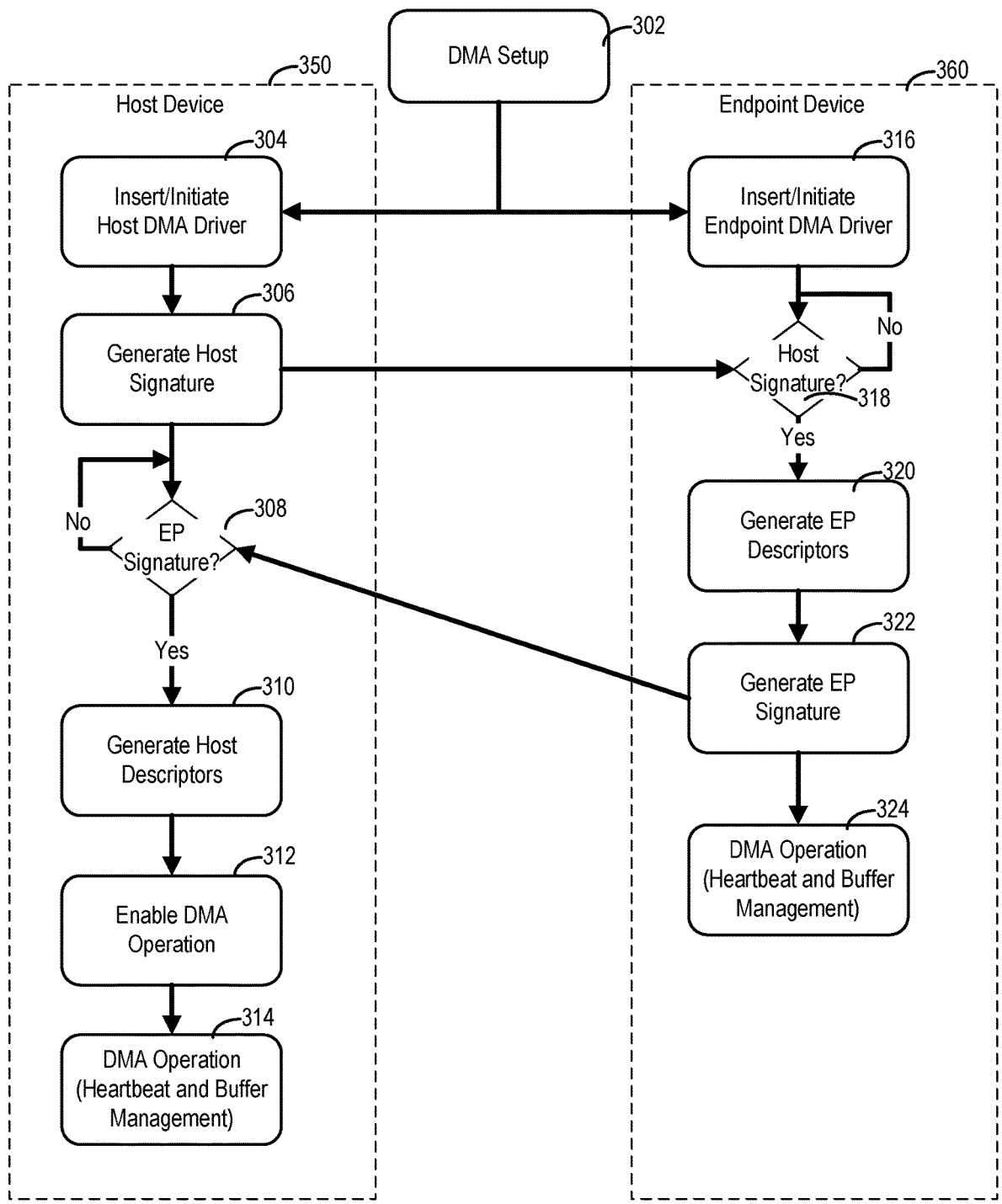
FIG. 3 is a flow diagram of a DMA operation of a host and endpoint device, consistent with implementations of the present disclosure.

FIG. 3 is a flow diagram of a DMA operation of a host and endpoint device, consistent with implementations of the present disclosure. The flow begins with an event that starts and begins setup of a DMA operation, per block 302. The specific purpose of the DMA transfer operation is not limited by the process. For example, the event may occur in response to programming of the endpoint device upon power up. A DMA transfer operation could then be used to move data from the host device to the endpoint device. The data can be used to setup or initialize different aspects of the endpoint device. As another example, the endpoint device might periodically upload a large amount of processed data to the host device. A DMA transfer operation could then be used to move the data from the endpoint device to the host device.

In response to the DMA event corresponding to block 302, the host device 350 and endpoint device 360 can insert or initiate their respective DMA drivers, per blocks 304 and 316, respectively. For example, the operating systems of each device can call a respective driver while also providing the relevant details of the DMA transfer operation to the DMA driver. The provided details might specify the location and size of data to be transferred relative to the device's memory space. For instance, an endpoint device may be configured to accumulate processed data and then move the data to the host device using DMA transfer operations. When a DMA transfer operation is to be initiated, the operating system of the endpoint device can insert the endpoint DMA driver while identifying the source location (within the endpoint memory space) and the amount (size) of accumulated data. Similarly, the operating system of the host device can be notified that a DMA transfer is requested by the endpoint device. The operating system of the host device can insert the host DMA driver while identifying a destination location (within the host memory space) for the data from the endpoint device.

Upon insertion, the host can generate a signature that is stored in a shared/scratchpad memory area, per block 306. The signature can be of varying complexity and have different amounts and types of data content, depending upon the particular application. For instance, a low complexity signature could be an unencrypted data value stored in a particular location within the shared memory area. A more complex signature could include data that uniquely identifies the (host) device that created the signature. The signature might also be formatted to allow authentication of the source of the signature and the signature might also be encrypted. For instance, the signature could include message authentication code (MAC) that the endpoint device can use to authenticate the sender.

The endpoint driver waits until a valid host signature is detected, per block 318. As a non-limiting example, the endpoint driver can periodically check (poll) a location within the shared memory until a valid signature is found. In response to detection of a valid host signature, the endpoint DMA driver can generate a set of endpoint descriptors, per block 320. For example, the endpoint DMA driver can configure source descriptors in the endpoint memory space if the transfer is from the endpoint device to the host device. The endpoint DMA driver can configure destination descriptors in the endpoint memory space if the transfer is from the host device to the endpoint device. In either situation, the descriptors provide enough information for the DMA engine to retrieve or store data in the endpoint memory space. The host DMA driver does not require access to this information about the endpoint memory space.

The descriptors that each respective driver generates correspond to the direction of the DMA transfer. In particular, a host-to-endpoint DMA transfer means that the host device generates source DMA descriptors and the endpoint device generates destination descriptors. The reverse is true for an endpoint-to-host DMA transfer, where the host device generates destination DMA descriptors and the endpoint device generates source descriptors. The descriptors for the host device are stored in the host memory space for retrieval by the DMA engine.

The DMA descriptors include addressing information that the DMA engine uses when accessing the respective memory spaces of the host and endpoint devices. The separate control over the descriptors by the respective drivers alleviates the need for either driver to obtain information about the memory space of the other device. For example, a host device could be compromised by an attacker. The attacker could use information about the memory space of the endpoint device to attempt to obtain secure data or to otherwise adversely affect the endpoint device's operation. This split-mode approach keeps software components at either end unaware of other domain's addressing thereby preventing potential misuse.

After the endpoint driver has generated the endpoint descriptors, the endpoint driver generates an endpoint signature, per block 322. The endpoint signature can be stored in the shared memory. The endpoint signature can be generated and stored in a manner that is similar to the corresponding discussion of the generation for the host signature. For instance, the endpoint signature could include authentication, encryption, or both.

The host driver waits until a valid endpoint signature is detected, per block 308. As a non-limiting example, the host driver can periodically check (poll) a location within the shared memory until a valid endpoint signature is found. In response to detecting a valid endpoint signature, the host driver generates a set of host descriptors, per block 310 and enables the DMA transfer operation, per block 312. This can include enabling one or more DMA channels controlled by the DMA engine.

The DMA transfer operation is then carried out and managed by the host driver and endpoint driver, per blocks 314 and 324, respectively. As part of the management, the host and endpoint drivers can manage the source and destination buffers used by the DMA engine. One aspect of this management can be setting the coalesce count for the respective buffers. The coalesce count defines how much data is collected or batched before a DMA operation (e.g., initiated through an interrupt) is carried out. Consistent with various implementations, there can be different coalesce counts for the source and destination data and buffers. Data is collected in the respective buffers until the corresponding coalesce count is exceeded.

Another aspect of DMA operation is to allow each driver to check on the health or status of the other device and corresponding driver. In particular, each driver can periodically generate a heartbeat signature that is stored in the shared memory space. Each driver can also check for the heartbeat signature of the other driver. If the heartbeat signature is not found, this can indicate that there is a problem with the other driver. For example, a host driver may fail to detect an endpoint heartbeat signature. The host driver can respond by halting the ongoing DMA transfer operation by disabling the DMA engine for the same transfer. In another example, an endpoint driver may fail to detect a host driver signature. The endpoint driver can respond by disabling the DMA channels used for the ongoing DMA operation.

Consistent with various implementations, thresholds can be set relative to the heartbeat signature. For instance, a driver could allow for N missed heartbeats to occur before the DMA transfer operation is halted. The number of acceptable missed heartbeats could be the same for the host and endpoint drivers, or they could be set differently.

Figure 4:
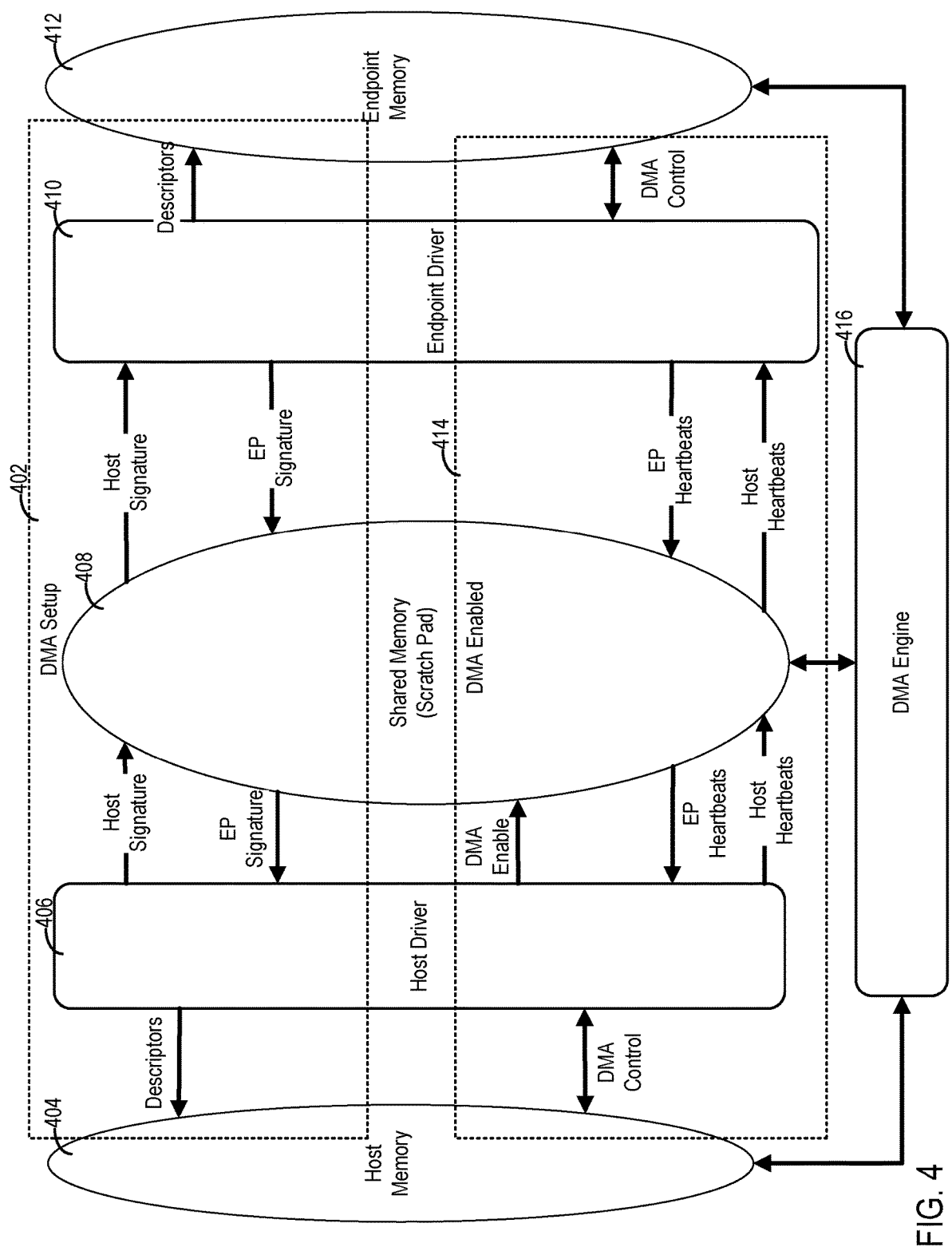
FIG. 4 depicts a logical diagram for a DMA transfer with split driver control over DMA descriptors, consistent with certain implementations.

FIG. 4 depicts a logical diagram for a DMA transfer with split driver control over DMA descriptors, consistent with certain implementations. The logical diagram is split into two phases or modes, DMA setup 402 and DMA enabled 414. During the DMA setup 402, the host driver 406 writes a host signature to shared memory (scratch pad memory) space 408. The endpoint driver 410 retrieves the host signature to verify that the host driver 406 has been inserted and is operating properly. The endpoint driver 410 can verify the host signature has been written to the shared memory 408 before generating and storing DMA descriptors.

As shown in FIG. 4, each of the host driver 406 and endpoint driver 410 write a set of descriptors to the host memory 404 and endpoint memory 412, respectively. Although the descriptors are shown as being written once, the drivers can continue to update the descriptors throughout the DMA transfer operation. The DMA engine 416 has access to both the host memory 404 and the endpoint memory 412, which allows the DMA engine 416 to retrieve the descriptors. The retrieved descriptors can then be stored in respective FIFO buffers. The descriptors include information that the DMA engine 416 uses to retrieve and store data that is to be transferred between the host memory 404 and the endpoint memory 412 as a DMA operation. The DMA transfer can be in either direction (host-to-endpoint or endpoint-to-host).

Once the endpoint driver 410 has provided a corresponding set of DMA descriptors, the endpoint driver 410 can write an endpoint (EP) signature to the shared memory. The host driver 406 can wait until an endpoint signature has been detected and verified before entering the DMA enabled mode 414. In the DMA enabled mode 414, the host driver 406 and endpoint driver 410 can monitor the progress of the DMA transaction based upon DMA control information provided by the DMA engine. The drivers can also provide DMA control information, including the updating of the DMA descriptors in respective memory spaces.

According to certain implementations, the endpoint drivers can write respective heartbeat signatures to the shared memory 408. The endpoint drivers can monitor the shared memory 408 for the heartbeat signature of the other driver in order to detect problems with the other driver. If the heartbeat signature is not detected, the endpoint driver can disabled the DMA engine 416 relative to the ongoing DMA transfer operation.

Figure 5:
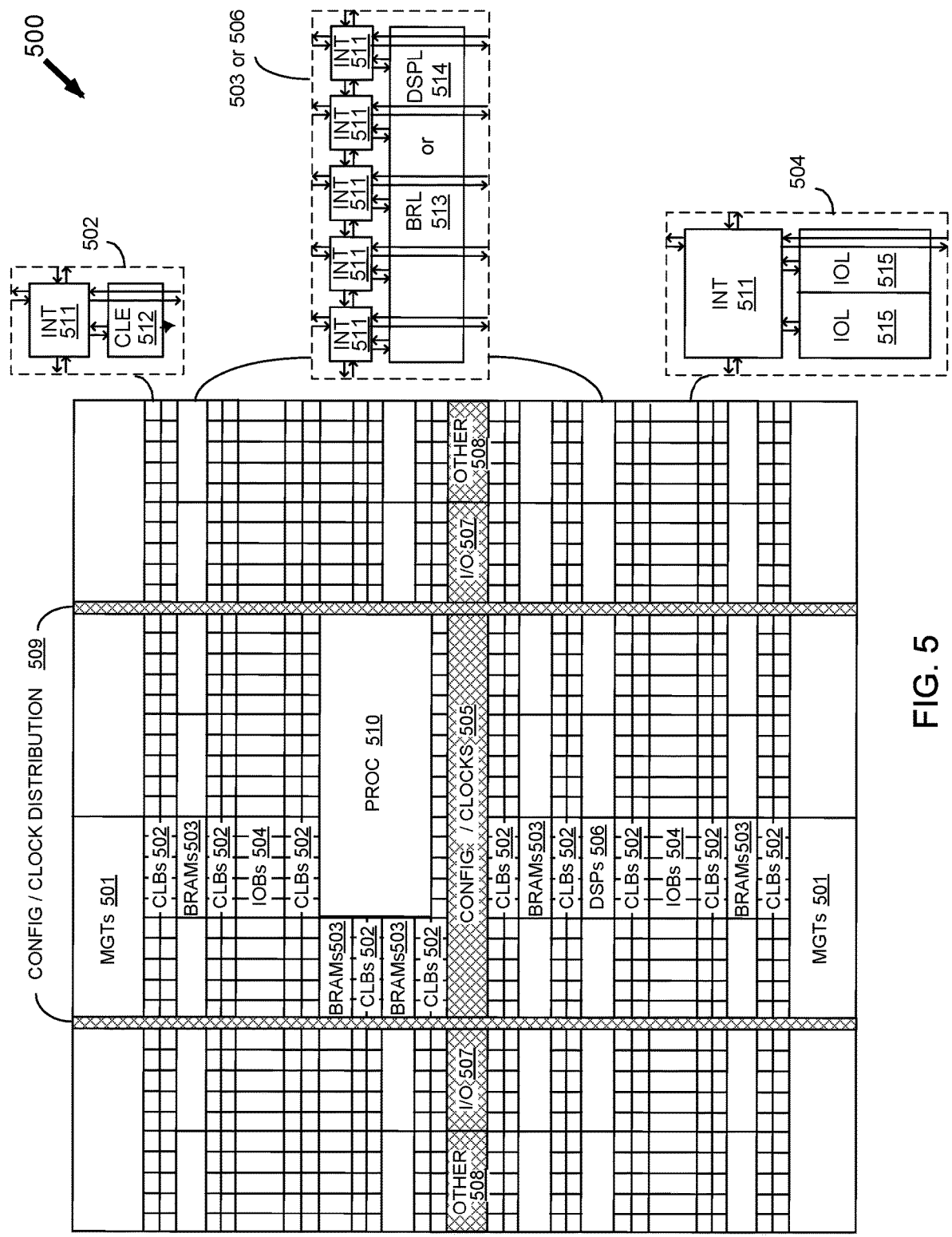
FIG. 5 shows a programmable integrated circuit (IC) 500 on which the disclosed circuits and processes may be implemented.

FIG. 5 shows a programmable integrated circuit (IC) 500 on which the disclosed circuits and processes may be implemented. The programmable IC may also be referred to as a System on Chip (SOC) that includes field programmable gate array logic (FPGA) along with other programmable resources. FPGA logic may include several different types of programmable logic blocks in the array. For example, FIG. 5 illustrates a programmable IC 500 that includes a large number of different programmable tiles including multi-gigabit transceivers (MGTs) 501, configurable logic blocks (CLBs) 502, blocks of random access memory (BRAMs) 503, input/output blocks (IOBs) 504, configuration and clocking logic (CONFIG/CLOCKS) 505, digital signal processing blocks (DSPs) 506, specialized input/output blocks (I/O) 507, for example, clock ports, and other programmable logic 508 such as digital clock managers, analog-to-digital converters, system monitoring logic, and so forth. Some programmable IC having FPGA logic also include dedicated processor blocks (PROC) 510 and internal and external reconfiguration ports (not shown).

In some FPGA logic, each programmable tile includes a programmable interconnect element (INT) 511 having standardized connections to and from a corresponding interconnect element in each adjacent tile. Therefore, the programmable interconnect elements taken together implement the programmable interconnect structure for the illustrated FPGA logic. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic, plus a single programmable interconnect element INT 511. A BRAM 503 can include a BRAM logic element (BRL) 513 in addition to one or more programmable interconnect elements. Often, the number of interconnect elements included in a tile depends on the height of the tile. In the pictured implementation, a BRAM tile has the same height as five CLBs, but other numbers (e.g., four) can also be used. A DSP tile 506 can include a DSP logic element (DSPL) 514 in addition to an appropriate number of programmable interconnect elements. An IOB 504 can include, for example, two instances of an input/output logic element (IOL) 515 in addition to one instance of the programmable interconnect element INT 511. As will be clear to those of skill in the art, the actual I/O bond pads connected, for example, to the I/O logic element 515, are manufactured using metal layered above the various illustrated logic blocks, and typically are not confined to the area of the input/output logic element 515.

In the pictured implementation, a columnar area near the center of the die (shown shaded in FIG. 5) is used for configuration, clock, and other control logic. Horizontal areas 509 extending from the column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 5 include additional logic blocks that disrupt the regular columnar structure making up a large part of the programmable IC. The additional logic blocks can be programmable blocks and/or dedicated logic. For example, the processor block PROC 510 shown in FIG. 5 spans several columns of CLBs and BRAMs.

Note that FIG. 5 is intended to illustrate only an example of programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 5 are provided purely as examples. For example, in an actual programmable IC, more than one adjacent column of CLBs is typically included wherever the CLBs appear, to facilitate the efficient implementation of user logic.

For the various flow diagrams depicted herein, the particular orders of the blocks and associated functions are provided as examples. The ordering is not necessarily limiting and can be varied according to various implementations.

Those skilled in the art will appreciate that various alternative computing arrangements, including one or more processors and a memory arrangement configured with program code, would be suitable for hosting the processes and data structures that may carry out functions disclosed herein. In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems that use RAM circuits. Other aspects and features will be apparent to those skilled in the art from consideration of the specification. The portions of the methods and system may be implemented as one or more processors configured to execute software, as an application specific integrated circuit (ASIC), or as a logic on a programmable logic device. Moreover, the various circuits identified herein may share hardware circuitry, such as use of a common computer processing unit or digital processing unit. It is intended that the specification and drawings be considered as examples only, with a true scope of the invention being indicated by the following claims.

What is claimed is:

1. A method comprising:
generating, by a host processor circuit executing a host driver, a host signature indicating a direct memory access (DMA) operation involving a transfer of data between a host memory and an endpoint memory;
providing the host signature to an endpoint processor circuit;
verifying whether or not the host signature is valid based on authentication of the host signature by the endpoint processor circuit executing an endpoint driver;
configuring endpoint descriptors in the endpoint memory by the endpoint processor circuit in response to verifying the host signature is valid, the endpoint descriptors defined for the DMA operation and relative to the endpoint memory;
generating an endpoint signature for the DMA operation by the endpoint processor circuit, in response to verifying the host signature is valid;
providing the endpoint signature to the host processor circuit;
receiving the endpoint signature by the host processor circuit;
detecting by the host processor circuit whether or not the endpoint signature is valid based on authentication of the endpoint signature;
configuring host descriptors in the host memory by the host processor circuit in response to detecting that the endpoint signature is valid, the host descriptors defined for the DMA operation and relative to the host memory;
enabling a DMA engine circuit by the host processor circuit to begin the DMA operation in response to detecting that the endpoint signature is valid;
retrieving the host descriptors from the host memory and the endpoint descriptors from the endpoint memory by the DMA engine circuit; and
performing the DMA operation by the DMA engine circuit by accessing the host memory based on host memory addresses of the host descriptors, and accessing the endpoint memory based on endpoint memory addresses of the endpoint descriptors.

2. The method of claim 1, wherein the host descriptors are source descriptors and the endpoint descriptors are destination descriptors.

3. The method of claim 1, wherein the host descriptors are destination descriptors and the endpoint descriptors are source descriptors.

4. The method of claim 1, wherein the writing to the host memory includes writing values specifying DMA transactions by indicating at least one start memory address in the host memory and at least one end memory address in the host memory.

5. The method of claim 1, further comprising verifying, during the DMA operation, a status for the endpoint processor circuit.

6. The method of claim 5, further comprising disabling, in response to the status indicating a problem with the endpoint processor circuit, the DMA engine circuit relative to the DMA operation.

7. The method of claim 5, wherein the verifying includes retrieving, from a memory space shared by the endpoint processor circuit and the host processor circuit, a heartbeat signature indicating the status of the endpoint processor circuit.

8. A system comprising:
a host processor circuit configured to execute a host driver;
a host memory coupled to the host processor circuit;
an endpoint processor circuit configured to execute an endpoint driver;
an endpoint memory coupled to the endpoint processor circuit;
a direct memory access (DMA) engine circuit coupled to the host memory and the endpoint memory;
wherein execution of the host driver causes the host processor circuit to:
  generate a host signature indicating a DMA operation involving a transfer of data between the host memory and the endpoint memory, and
  provide the host signature to the endpoint processor circuit;
wherein execution of the endpoint driver causes the endpoint processor circuit to:
  verify the host signature based on authentication of the host signature,
  configure endpoint descriptors of the DMA operation in response to successfully verifying the host signature,
  generate an endpoint signature in response to successfully verifying the host signature, and
  provide the endpoint signature to the host processor circuit;
wherein execution of the host driver causes the host processor circuit to:
  receive the endpoint signature,
  detect whether or not the endpoint signature is valid based on authentication of the endpoint signature,
  configure in the host memory and in response to detecting that the endpoint signature is valid, host descriptors of the DMA operation, and
  enable the DMA engine circuit to begin the DMA operation in response to detecting that the endpoint signature is valid;
wherein the DMA engine circuit is configured to:
  retrieve the host descriptors from the host memory and the endpoint descriptors from the endpoint memory by the DMA engine circuit, and
  perform the DMA operation by the DMA engine circuit by accessing the host memory based on host memory addresses of the host descriptors, and accessing the endpoint memory based on endpoint memory addresses of the endpoint descriptors.

9. The system of claim 8, wherein execution of the host driver causes the host processor circuit to set a host coalesce count for host buffers of the DMA engine circuit; and execution of the endpoint driver causes the endpoint processor circuit to set an endpoint coalesce count for endpoint buffers of the DMA engine circuit.

10. The system of claim 8, wherein the host descriptors are destination descriptors and the endpoint descriptors are source descriptors.

11. The system of claim 8, wherein the host descriptors define start and end addresses for the transfer of data relative to the host memory.

* * * * *